United States Patent [19]
Komoda et al.

[11] 3,932,002
[45] Jan. 13, 1976

[54] BRAKE CONTROL APPARATUS

[75] Inventors: Norio Komoda; Zensaku Murakami, both of Susono, Japan

[73] Assignee: Toyota Jidosha Kogyo Kabushiki Kaisha, Japan

[22] Filed: Sept. 27, 1974

[21] Appl. No.: 510,030

[30] Foreign Application Priority Data
Sept. 28, 1973  Japan.............................. 48-108555

[52] U.S. Cl. ............................ 303/22 R; 303/24 R
[51] Int. Cl.² ......................................... B60T 8/24
[58] Field of Search ............ 180/103; 188/177, 192; 303/22 A, 22 R, 24 F, 24 A, 24 C, 24 R, 6 C

[56] References Cited
UNITED STATES PATENTS

| | | | |
|---|---|---|---|
| 2,181,161 | 11/1939 | Wolf | 303/24 R X |
| 2,845,149 | 7/1958 | Stern et al. | 303/22 R X |
| 3,325,224 | 6/1967 | Brueder | 303/22 R X |
| 3,614,175 | 10/1971 | Lawson | 303/22 R |

*Primary Examiner*—Duane A. Reger
*Attorney, Agent, or Firm*—Toren, McGeady and Stanger

[57] ABSTRACT

Apparatus for controlling an hydraulic braking system for an automotive vehicle is operated to apply a reduced braking force upon the innermost wheels of the vehicle during turning thereof in order to prevent undesired locking of the inside wheels. The apparatus comprises a pressure reducing valve connected in the hydraulic brake line extending from a master cylinder to the wheel cylinders of the left and right wheels of the vehicle and a directional control valve which operates to selectively apply to a given wheel either the higher hydraulic braking pressure directly from the master cylinder or a reduced pressure which is produced by passing the hydraulic fluid from the master cylinder through the pressure reducing valve before application to the wheel cylinders. A load sensitive means which is sensitive to load changes at the left and right wheels and which operates the pressure reducing valve and the directional control valve operates to sense the direction of turning of the vehicle and to effect application of the braking force exerted on the inside wheels at a reduced level developed through the pressure reducing valve in accordance with the load change at a given wheel.

9 Claims, 4 Drawing Figures

BRAKE CONTROL APPARATUS

BACKGROUND OF THE INVENTION

The present invention relates to brake control apparatus, and more particularly to a mechanism which is used in a hydraulic pressure braking system for automotive vehicles to control the braking force applied upon the wheels of the vehicle during turning of the vehicle.

Generally, when a vehicle is executing a turn, an acceleration force is produced in a direction laterally of the vehicle whereby the load of the vehicle body is shifted toward the wheels which are located inwardly of the turning curve. It should be understood that as used hereinafter, the term "inside wheels" is used to refer to those wheels which are located inwardly of the turning curve of the vehicle and in this sense, the term "outside wheels" will refer to those wheels located outwardly of the turning curve.

If, during turning of the vehicle, the same brake force is applied upon the inside wheels and the outside wheels, the inside wheels will undergo a stronger braking force than the outside wheels due to the influence of the load shifting mentioned above. Accordingly, the inside wheels may tend to become locked at an unduly early stage, thereby creating a situation which is not desirable from the standpoint of safe vehicle operation.

The present invention is directed to the provision of a brake control apparatus in which the braking hydraulic pressure applied on the inside wheel or wheels of the vehicle at the time of simultaneous braking and turning of the vehicle is reduced in accordance with the magnitude of rebounding or relative motion of these wheels caused by the above-mentioned load shifting so that locking of the inside wheels at an unduly early stage of the operation of the brake system will be avoided.

SUMMARY OF THE INVENTION

Briefly, the present invention may be described as apparatus for controlling application of braking fluid pressure to the wheels of the vehicle, said apparatus comprising a pressure reducing valve which is connected in the hydraulic braking system of the vehicle and which is adapted to emit a reduced level of fluid pressure, a directional control valve which selectively directs application of the reduced fluid pressure to either of the right or left wheels of the vehicle and sensing means responsive to the direction of turning of the vehicle for actuating the directional control valve in accordance with the direction in which the vehicle is turned to effect application of the lower pressure to the wheels on the inside of the vehicle. The directional control valve is arranged to have applied therethrough the fluid pressure generated by a master cylinder of the braking system which may be directly applied as a higher pressure level to the wheels of the vehicle in accordance with operation of the directional control valve. The pressure reducing valve is connected in parallel with the flow path which extends directly between the master cylinder and the directional control valve and operates to selectively apply a reduced level of hydraulic braking pressure through the directional control valve. Thus, depending upon the disposition of the sensing means which are connected to actuate the directional control valve, a higher or lower braking force may be applied to the wheels of the vehicle depending upon the direction of turning of the vehicle. Those wheels which are to receive a higher braking force will be directly connected to the master cyclinder through the directional control valve. Those wheels which are to receive a lower braking force will be connected through the directional control valve to the pressure reducing valve. The sensing means are operatively associated with the pressure reducing valve in order to cooperate therewith to produce the desired lower pressure level when a vehicle turn is to be executed simultaneously with application of a braking force.

The sensing means may comprise a pair of pivoted lever mechanisms which are connected across the suspension springs on the right and left side of the vehicle and which operate to sense the load at a given wheel and thereby to effect a pivotal motion actuating both the directional control valve and the pressure reducing valve in accordance with the direction of turning of the vehicle.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
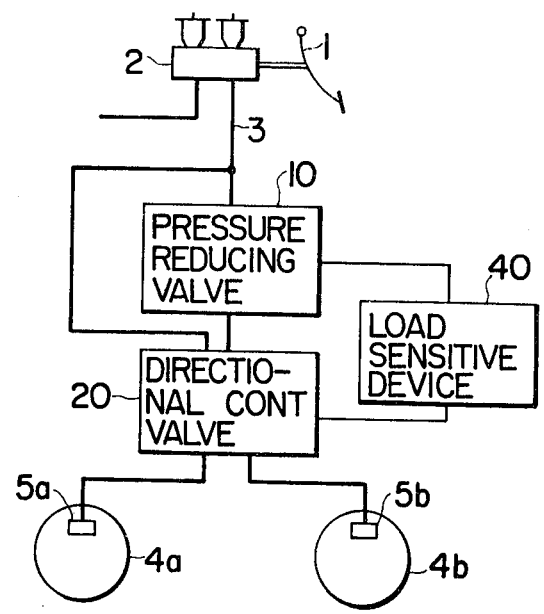
FIG. 1 is a block diagram showing a hydraulic braking system in which the brake controlling apparatus of the present invention is applied in association with the rear wheels of a vehicle.

Referring now to FIG. 1 of the drawings, a brake control apparatus in accordance with the present invention is illustrated as applied, by way of example, to controlling the braking force produced upon the rear wheels of a vehicle. The hydraulic braking system of the vehicle includes a master cylinder 2 which may, for example, be of a tandem arrangement connected through rear wheel hydraulic brake lines 3 to respective wheel cylinders 5a, 5b, of a left rear wheel 4a and a right rear wheel 4b. The master cylinder 2 is designed, as is generally known to produce a braking force corresponding to the braking pressure applied upon a brake pedal 1 located in the passenger compartment of the vehicle.

The brake lines 3 are connected through a pressure reducing valve 10 which operates to regulate the hydraulic pressure of the brake fluid, a directional control valve 20 for directing brake fluid pressure selectively to the wheel cylinder 5a or to the wheel cylinder 5b, and a load sensitive device 40 which is sensitive to the change in the load at the wheels so as to control operation of the valves 10 and 20.

Figure 2:
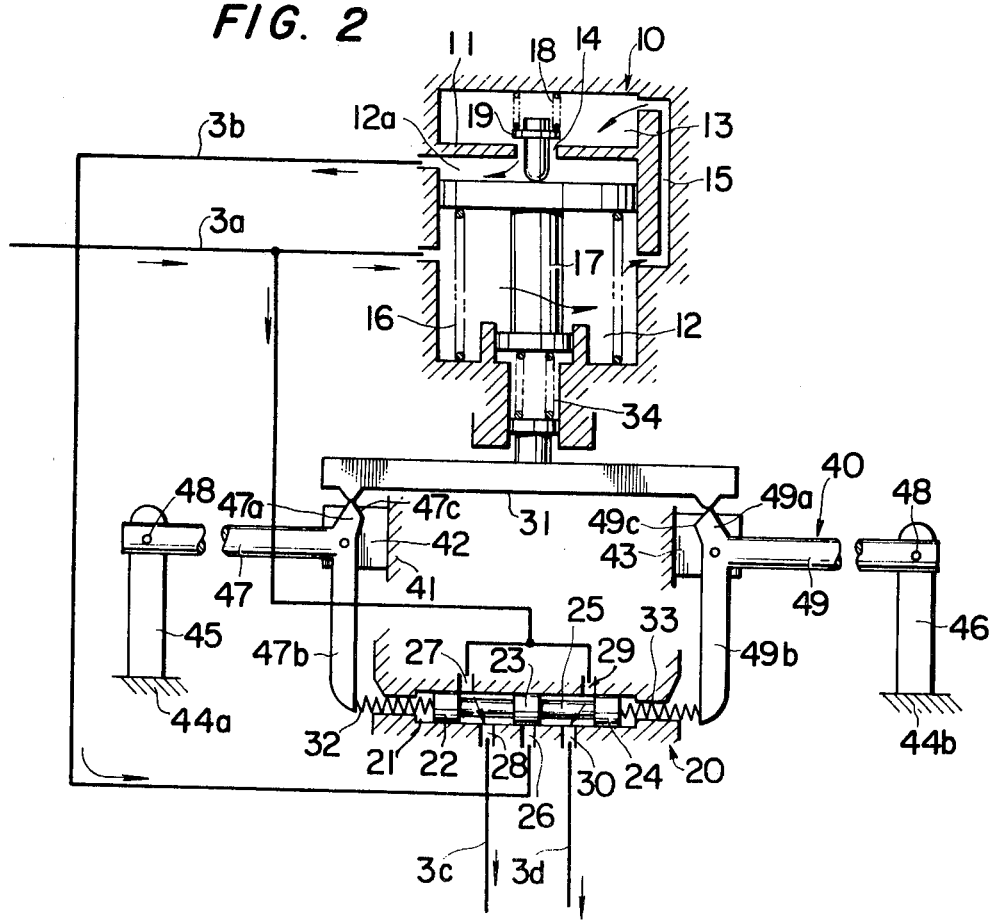
FIG. 2 is a schematic view illustrating an embodiment of the brake control apparatus of the present invention.

Referring now to FIG. 2, the pressure reducing valve 10 is shown as including two chambers 12 and 13 which are divided from each other by the partition wall 11. A passage 15 is provided for bypassing the partition wall 11 and a port 14 extends through the partition wall 11 in order to communicate the chamber 12 and 13 with each other.

A piston 17 loaded with a spring 16 is arranged in the chamber 12 in a manner to be freely movable therein in vertical directions. A valve body 19 loaded with a spring 18 is fitted in the port 14 in order to effect opening and closing of the valve through cooperation with the piston 17.

A hydraulic conduit 3a extending from the master cylinder is connected to the chamber 12 with a conduit 3b being connected to the space 12a formed between the partition wall 11 and the head of the piston 17. The conduit 3b operates to derive a reduced hydraulic pressure for braking from the pressure reducing valve 10.

With such an arrangement, hydraulic braking pressure is transmitted from the conduit 3a through the chamber 12, passage 15, chamber 13, and port 14 to the conduit 3b. In the case where the hydraulic pressure is low, a lower force will be exerted upon the piston 17 by the fluid in the chamber 12a and accordingly the piston 17 will be moved upwardly by the force of the spring 16. This, in turn, causes the valve body 19 to move upwardly together with the piston 17 thus increasing the opening of the port 14.

In such a case, no substantial reduction in the hydraulic braking pressure will occur between the conduit 3a and the conduit 3b. However, in the case where hydraulic pressure in the conduit 3a is increased and reaches a predetermined value, the piston 17 will be urged downwardly against the biasing force of the spring 16 by the force exerted through the brake fluid in the chamber 12a. This, in turn, will cause the valve body 19 to move downwardly together with the piston 17 and the opening of the port 14 will be reduced. Thus, hydraulic pressure in the conduit 3b will be increased at a smaller rate than that in the conduit 3a.

The directional control valve 20 includes a valve cylinder 21 within which there is slidably arranged a valve spool 25 which has formed thereon three lands 22, 23, and 24. The valve spool 25 is arranged to be movable leftwardly and rightwardly within the cylinder 21, as viewed in FIG. 2. Extending from the cylinder 21 is a port 26 which is arranged to be opened or closed by the center land 23 of the spool 25. Ports 27 and 28 also extend from the cylinder 21, and communication between these ports is controlled by the land 22. Ports 29 and 30, which also extend from the cylinder 21, have the communication therebetween controlled by the land 24.

Both ports 27 and 29 are connected to the conduit 3a, while the port 26 is connected to the conduit 3b. Furthermore, the port 28 is connected to a conduit 3c which extends to the wheel cylinder 5a of the left rear wheel 4a. The port 30 is connected to a conduit 3d which extends to the wheel cylinder 5b of the right rear wheel 4b. With such an arrangement, hydraulic braking pressure in the conduit 3a or in the conduit 3b will be selectively applied to the conduits 3c or 3d depending upon the position of the valve spool 25 in the valve cylinder 21.

Load sensitive means 40 is interposed between the pressure reducing valve 10 and the directional control valve 20. The sensing means 40 includes a pair of brackets 42 and 43 which are affixed at the same level to a portion 41 of the vehicle body which is supported on suspension springs (not shown). On the left side of one bracket 42 there is provided a bracket 45 which is affixed to a portion 44a of the wheel axle housing which is located downwardly from the suspension spring (not shown) on the left side of the vehicle. Similarly, on the right side of the other bracket 43 there is provided a bracket 46 which is fixed to a portion 44b of the wheel axle housing that is located downwardly of the suspension spring (not shown) on the right side of the vehicle.

A lever 47 extends between the two left side brackets 42 and 45 in a manner whereby there is permitted pivotal movement about a pin 48. The lever 47 is provided at its upper portion with a cam 47a which includes a surface 47c inclined downwardly to the right, and at its lower portion with an actuator arm 47b.

Similarly, on the opposite side of the vehicle body there is provided another lever 49 which extends between the two right side brackets 43 and 46 in such a manner as to be pivotally movable about a pin 48. The lever 49 is provided at its upper portion with a cam 49a which includes a surface 49c inclined downwardly to the left, and at its lower portion with an actuator arm 49b.

Thus, the two levers 47 and 49 will be disposed symmetrically on both sides of the suspension springs.

Mounted upon the cams 47a and 49a of the levers 47 and 49, respectively, is a connecting member 31 which is moved downwardly as a result of pivotal movement of the levers 47 and 49. A spring 34 is interposed between the central portion of the connecting member 31 and the lower end portion of the piston 17 in a manner whereby the connecting member 31 and the piston 17 may be cooperatively associated with each other.

The arms 47b and 49b are linked, respectively, with opposite ends of the valve spool 25 of the directional control valve 20 through a pair of springs 32 and 33. Pivotal movement of the levers 47 and 49 will effect movement of the arms 47b and 49b in such a manner as to cause longitudinal movement of the valve spool 25 within the cylinder 21.

With such an arrangement, when the vehicle is not being turned and is moving in a straight path, the lever 47 and 49 will extend horizontally as shown in FIG. 2 and the connecting member 31 will be maintained at its uppermost position supported upon the cams 47a and 49a. Thus, in this condition, the force of the spring 34 exerted upon the piston 17 will be rather strong so that no substantial pressure reducing effect will be produced. Under such circumstances, the spring forces of the springs 32 and 33 will be balanced so that spool 25 will be held at its central position within the valve cylinder 21.

With the spool 25 in this position, the port 26 will be closed by the land 23 and the ports 27 and 29 will be communicated with the ports 28 and 30, respectively. When a braking effect is introduced under such conditions, the hydraulic braking pressure in the master cylinder 2 will be directly transmitted to the wheel cylinders 5a and 5b without passing through the pressure reducing valve 10, inasmuch as the conduit 3b extending from the valve 10 will be cut off and only the conduit 3a extending directly from the master cylinder 2 will be communicated with the conduits 3c and 3d. Accordingly, braking forces on an equivalent level will be exerted upon the left and right wheels 4a and 4b in a balanced arrangement, as in the case of conventional braking systems.

Figure 3:
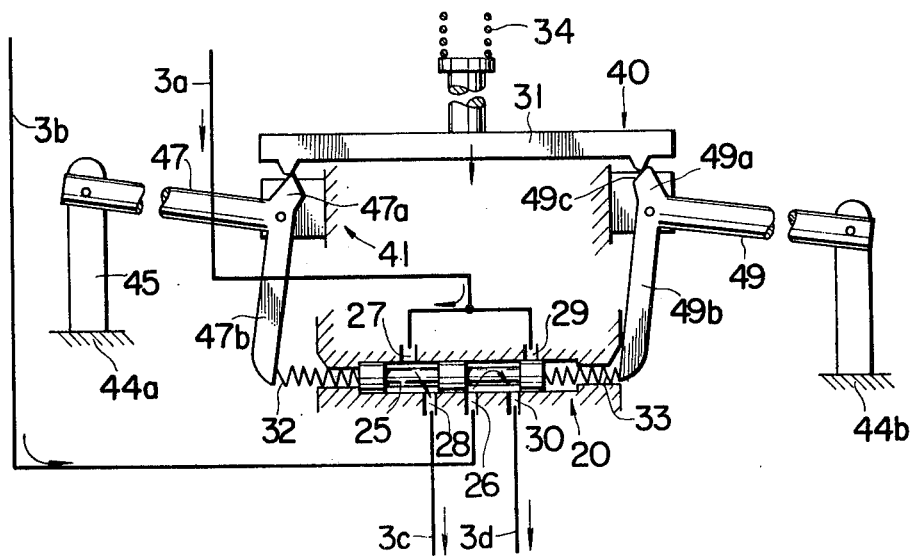
FIG. 3 is a schematic view depicting operation of the apparatus shown in FIG. 2 at the time that a vehicle is braked while simultaneously making a right turn.

However, when a braking force is applied while the vehicle is being turned, a different braking force will be applied to wheels on one side of the vehicle than to the wheels on the other side. For example, if the vehicle is turned to the right, the portion 44a of the axle housing which is located beneath the left side suspension spring will be driven closer to the vehicle body portion 41 by compression of the suspension spring on that side and, at the same time, the portion 44b of the axle housing which is located beneath the right side suspension spring will be separated from the vehicle body. This will cause the levers 47 and 49 to be pivoted about the brackets 42 and 43, respectively, so that these two levers will be turned away from their horizontal position to the inclined position shown in FIG. 3. As a result, the connecting member 31 will be moved out of engagement with the left side cam 47a and will be caused to move downwardly along the inclined surface 49c of the right side cam 49a . Thus, the resilient force of the spring 34 will be weakened and the presssure reducing valve 10 will achieve its pressure reducing function at an earlier stage than in the case of braking with the vehicle moving in a straight path when the braking hydraulic pressure is still low.

With pivotal movement of the levers 47 and 49, the actuator arm 47b will be moved away from the directional control valve 20, thereby reducing the resilient force in the spring 32, while the actuator arm 49b is moved toward the directional control valve 20 thereby increasing the resilient force of the spring 33. As a result, the spool 25 will be forced to the left so that communication between the port 29 and the port 30 will be cut off by the land 24, while the land 23 is moved out of engagement with the port 26 to establish communication between the port 26 and the port 30.

The hydraulic braking pressure in the conduit 3a is, therefore, transmitted directly to the conduit 3c. However, the hydraulic pressure which is transmitted to the conduit 3d will be a reduced pressure effected as a result of operation of the pressure reducing valve 10.

Thus, the braking force exerted on the right wheel 4b will be smaller than that exerted on the left wheel 4a.

Similarly, in a case where braking force is supplied while the vehicle is being turned to the left, the portion 44b of the vehicle body that is located beneath the right side of the axle housing that is located beneath the right side suspension spring will be driven closer to the vehicle body portion 41 by compression of the right side suspension spring and the portion 44a of the axle housing that is located under the left side suspension spring will be, conversely, separated from the vehicle body portion 41 by extension of the left side compression spring. This will cause the levers 47 and 49 to be inclined from the horizontal in a manner opposite to that shown in FIG. 3 with the result that the connecting member 31 will be moved downwardly along the inclined surface 47c of the cam 47a. Thus, the pressure reducing valve 10 will be actuated to perform its pressure reducing function in a manner similar to that effected when the vehicle is making a right turn.

At the same time, the resilient force of the spring 32 will become stronger than that of the force of the spring 33 so that spool 25 will be caused to be moved to the right with communication between the port 26 and the port 28 being established. Thus, a reduced hydraulic pressure is supplied to the conduit 3c, and the braking force exerted on the left wheel 4a becomes smaller than that exerted on the right wheel 4b.

At the time that a braking force is being applied during turning of the vehicle, as described above, the magnitude of bounding and rebounding, or relative movement, at the portion 44a or at the portion 44b of the axle housing or suspension member located beneath the suspension springs varies in accordance with the turning radius and the load change produced, for example, by a change in vehicle speed. Furthermore, the magnitude of displacement of the connecting member 31, the resilient force of the spring 34, and the value of the hydraulic braking pressure reduced by the pressure reducing valve 10, are changed in a proportional relationship relative to the magnitude of the bounding or rebounding, that is, relative movement of the unsprung portion against vehicle body. "unsprung portion" means the portion 44a or the portion 44b of the vehicle located beneath the suspension springs. As the displacement of the unsprung portion on one side at the vehicle wheel is increased downwards with change in the load, the value of the hydraulic pressure reduced by the pressure reducing valve is decreased so that its pressure reducing effect is enhanced.

Figure 4:
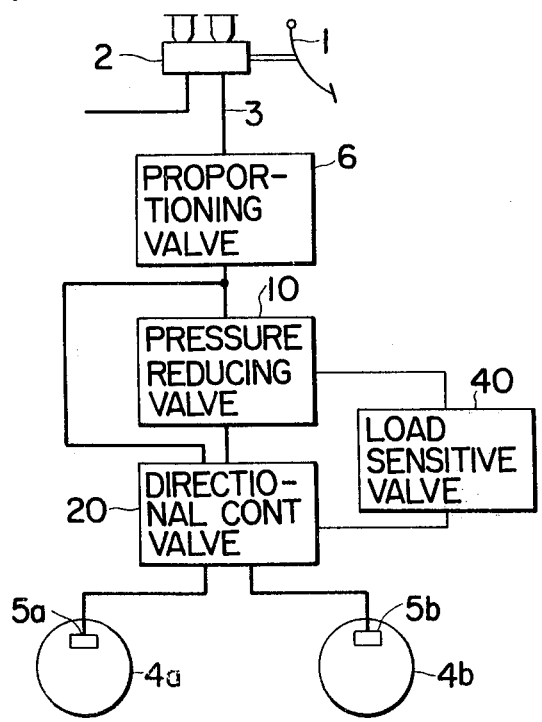
FIG. 4 is a block diagram showing a hydraulic braking system in which the brake control apparatus of the present invention is utilized with a proportioning valve.

In FIG. 4 there is illustrated a second embodiment of the invention in which a proportioning valve is additionally incorporated within the arrangement of FIG. 1. In FIG. 4, a proportioning valve 6 is incorporated between the master cylinder 2 and the pressure reducing valve 10. The function of the proportioning valve 6 is to compensate for shift in load in the longitudinal direction which is produced when the vehicle speed is slowed by braking during a time that the vehicle is moving in a straight path. Also, there will be provided a controlled braking hydraulic pressure. Furthermore, the valve 6 is designed to provide a further controlled braking hydraulic pressure when the vehicle is turned to the left or to the right immediately after a straight running condition.

AS described in the foregoing, the brake control apparatus of the present invention is so operated as to reduce the braking force applied on the inside wheels when a vehicle is braked during execution of a turn. Accordingly, drift-out and spin-out of the vehicle due to early locking of the inside wheels are positively prevented. It will be seen that the invention provides safe driving conditions and that, moreover, it will operate to improve braking performance at the time of simultaneous braking and turning of the vehicle. Furthermore, the brake control apparatus of the invention includes means sensitive to load change in the right or left wheels which is produced by an acceleration force in the lateral direction of the vehicle under such simultaneous braking and turning conditions. The braking force is controlled in a proportional relationship with the above-mentioned load change so that no deficiency or excess in braking force will occur.

Although in the foregoing the present invention has been described in connection with the further embodiments wherein the braking control apparatus of the invention is used to control rear wheels alone, it is to be understood that the apparatus can also be applied on the front wheels or on all four wheels of the vehicle in the same manner.

While specific embodiments of the invention have been shown and described in detail to illustrate the application of the inventive principles, it will be understood that the invention may be embodied otherwise

What is claimed is:

1. Apparatus for controlling application of braking fluid pressure to the wheels of a vehicle, said vehicle having left and right wheels, a hydraulic fluid system for individually applying braking pressure to said wheels, and suspension springs resiliently supporting said vehicle upon said wheels, said apparatus comprising a pressure reducing valve connected in said hydraulic system and adapted to emit a reduced level of fluid pressure, a directional control valve for selectively directing application of said reduced fluid pressure to either said right or said left wheels of said vehicle, load sensitive means including lever means responsive to movement of portions of said vehicle body located below said suspension springs, said load sensitive means being repsonvie to changes in load produced when said vehicle is turned simultaneously with application of braking force to said wheels to cause pivoting of said lever means, a connecting member operatively interposed between said lever means and said pressure reducing valve for adjusting the degree of pressure reduction effected by said valve in response to movement of said lever means, and actuator arm means mounted for pivotal motion together with said lever means and engaging said directional control valve to control the application of pressure therethrough to said wheels during turning of said vehicle to transmit said reduced fluid pressure from said pressure reducing valve to said vehicle wheels located inwardly of the turning curve of said vehicle.

2. Apparatus for controlling application of braking fluid pressure to the wheels of a vehicle, said vehicle having a plurality of left wheels and a plurality of right wheels a hydraulic fluid system for applying braking pressure to said wheels, and suspension springs resiliently supporting said vehicle upon said wheels, said apparatus comprising means for generating in said hydraulic system a higher and a lower level of braking hydraulic fluid pressure, directional control valve means operable upon actuation thereof to selectively direct said higher and lower pressure levels, respectively or inversely, to said right wheels or said left wheels, sensing means responsive to the direction of turning of said vehicle, said sensing means being arranged to actuate said directional control valve means in accordance with the direction in which said vehicle is turned to simultaneously effect application of said lower pressure level to all of the wheels on one side of said vehicle while simultaneously effecting application of said higher pressure level to all of the wheels on the other side of said vehicle when said hydraulic system is actuated simultaneously with turning of said vehicle.

3. Apparatus according to claim 2 wherein said sensing means comprise means for sensing differences between load applied to all of said left wheels and to all of said right wheels during turning of said vehicle, and means for actuating said directional control valve means to simultaneously apply said higher pressure level to all of the wheels on one side of said vehicle having applied thereto a higher load than the wheels on the other side of such vehicle.

4. Apparatus according to claim 3, including means for turning said vehicle through a curved path whereby all of the wheels one one side of said vehicle will be located radially inwardly of said path relative to all of the wheels on the other side of said vehicle, wherein said sensing means is arranged to actuate said directional control valve means to simultaneously apply said lower braking hydraulic pressure to all of said inwardly located wheels and said higher braking pressure to all of said other wheels.

5. Apparatus for controlling application of braking fluid pressure to the wheels of a vehicle, said vehicle having left and right wheels, a hydraulic fluid system for applying braking pressure to said wheels, and suspension springs resiliently supporting said vehicle upon said wheels, said apparatus comprising means for generating in said hydraulic system a higher and a lower level of braking hydraulic fluid pressure, directional control valve means operable upon actuation thereof to selectively direct said higher and lower pressure levels to said right or left wheels, sensing means responsive to the direction of turning of said vehicle, said sensing means being arranged to actuate said directional control valve means in accordance with the direction in which said vehicle is turned to effect application of said lower pressure level to the wheels on one side of said vehicle and said higher pressure level to the wheels on the other side of said vehicle when said hydraulic system is actuated simultaneously with turning of said vehicle, said sensing means comprising at least a pair of lever means each located on opposite sides of said vehicle and each connected across a suspension member, said lever means being mounted for individual pivotal movement in response to relative movement between portions of said vehicle located on opposite sides of said suspension member, each of said lever means being mounted for cooperative engagement with said directional control valve means to cause actuation thereof as a result of pivotal movement of said lever means occurring during turning of said vehicle.

6. Apparatus according to claim 5 wherein each of said lever means is pivotally mounted to rotate in an identical given direction upon turning of said vehicle in one direction, with the direction of rotation of said lever means being reversed when said vehicle is turned in a direction opposite to said one direction.

7. Apparatus according to claim 5, wherein said directional control valve means comprise a valve cylinder, an elongated valve spool having a first and a second end said spool being slidably movable within said cylinder, means communicating said higher and lower pressure levels with said right and left wheels through said valve cylinder, means on said valve spool for selectively controlling said communicating means in accordance with the position of said valve spool within said cylinder to selectively apply said higher and lower pressure levels to said left and right wheels, and means interconnecting each of said pair of lever means with one of the ends of said spool to effect sliding displacement of said spool within said cylinder in accordance with pivotal movement of said lever means.

8. Apparatus according to claim 5, wherein said hydraulic fluid system includes a master cylinder for producing said braking fluid pressure upon actuation of said hydraulic system, and wherein said means for generating said higher and lower pressure levels include conduit means for applying the fluid pressure developed by said master cylinder directly to said directional control valve means and a pressure reducing valve connected in parallel with said conduit means in flow communication between said master cylinder and said directional control valve, said pressure reducing valve means being configured to reduce the pressure from said master cylinder and to apply said reduced pressure simultaneously with said higher direct pressure through said directional control valve means, said pressure reducing valve means being connected to effect said pressure reduction in response to operation of said sensing means.

9. Apparatus according to claim 8, including proportioning valve means located in flow communication between said master cylinder and said pressure reducing valve means.

* * * * *